(No Model.) 5 Sheets—Sheet 1.

D. J. JONES & W. L. CLOUSE.
SCREW CUTTING MACHINE.

No. 521,543. Patented June 19, 1894.

Witnesses.
W. A. Biddle
Henry Ford

Inventors.
D. J. Jones
W. L. Clouse
By W. H. Burridge Atty.

(No Model.) 5 Sheets—Sheet 2.
D. J. JONES & W. L. CLOUSE.
SCREW CUTTING MACHINE.
No. 521,543. Patented June 19, 1894.
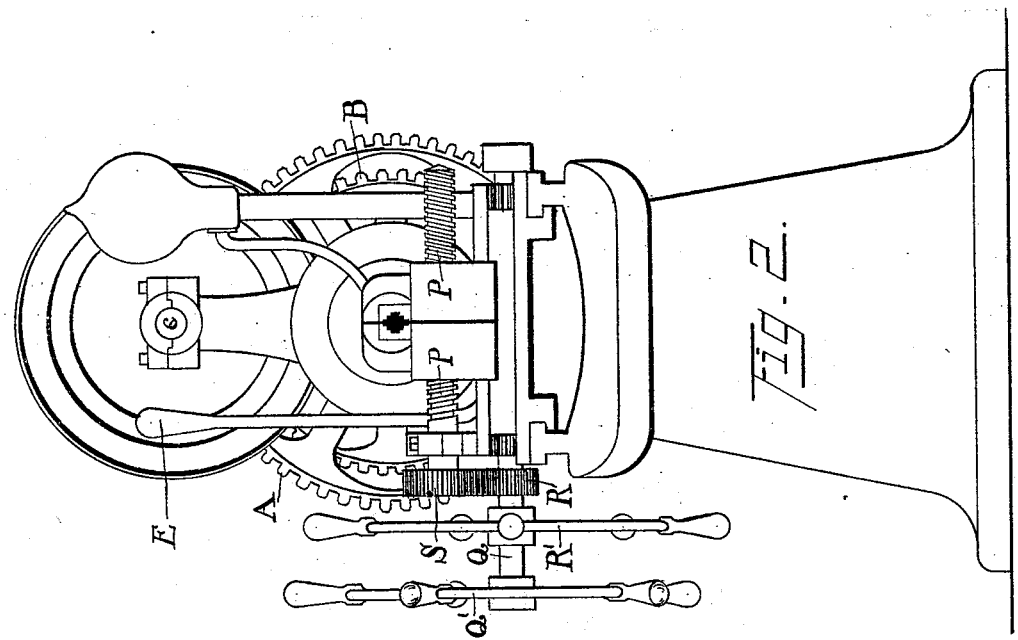
Witnesses.
W. A. Biddle
Henry Ford
Inventors.
D. J. Jones
W. L. Clouse
By W. H. Burridge
Atty.

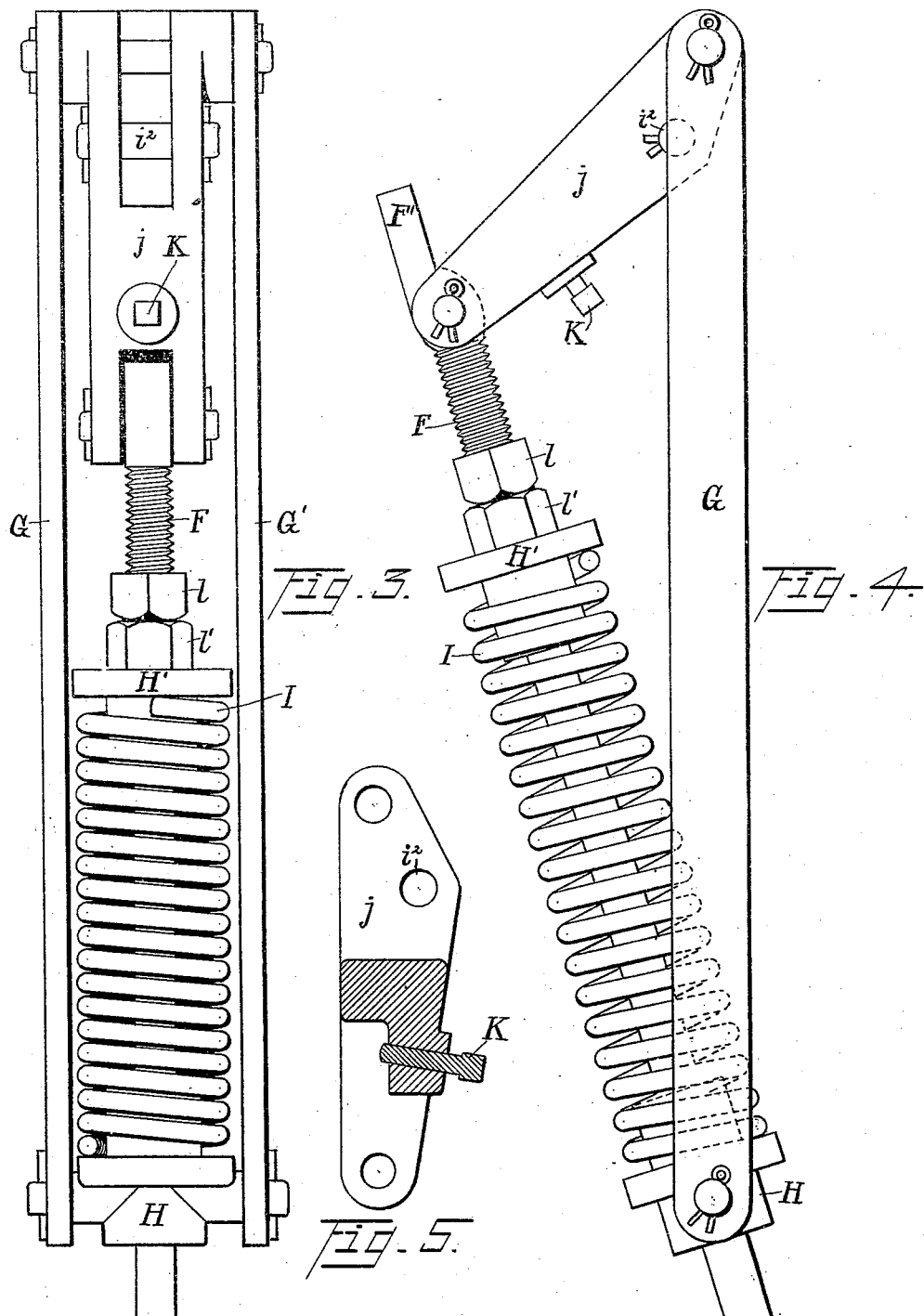

(No Model.) 5 Sheets—Sheet 4.
D. J. JONES & W. L. CLOUSE.
SCREW CUTTING MACHINE.
No. 521,543. Patented June 19, 1894.
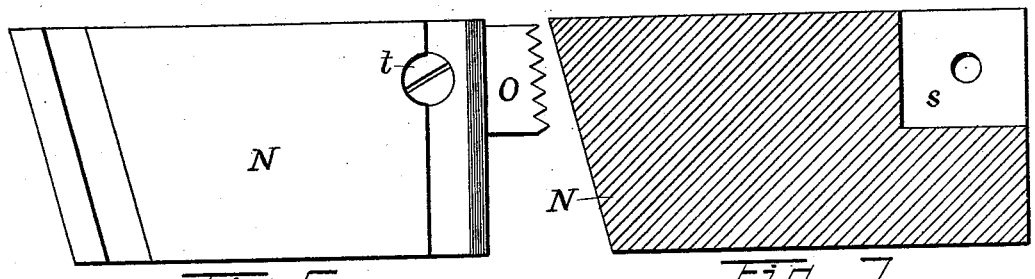
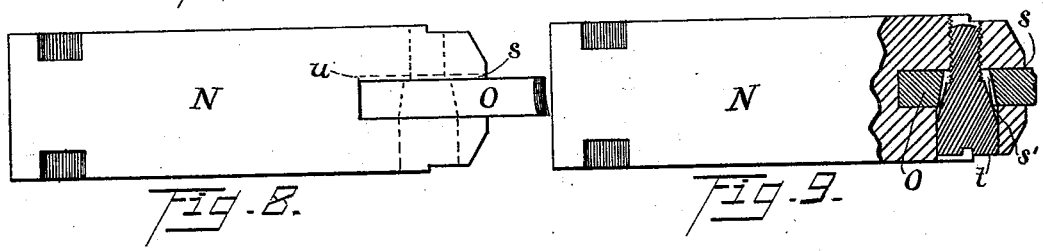
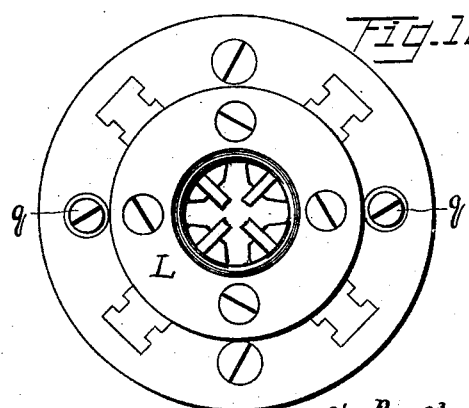
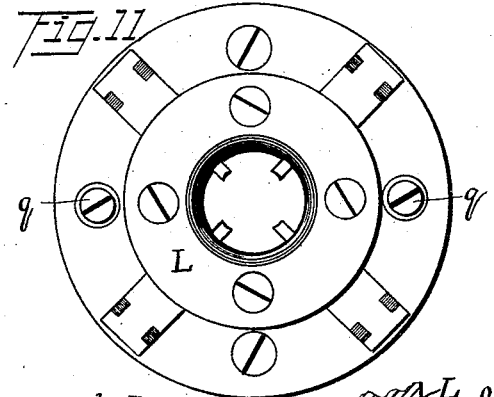
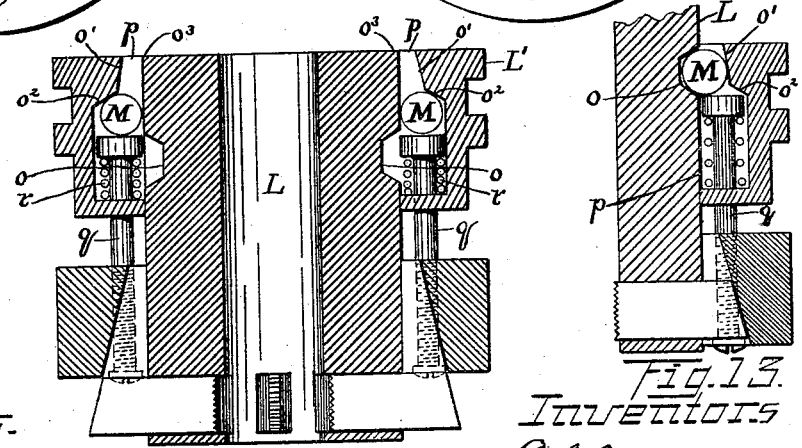

(No Model.) 5 Sheets—Sheet 5.

D. J. JONES & W. L. CLOUSE.
SCREW CUTTING MACHINE.

No. 521,543. Patented June 19, 1894.

Witnesses.
W. A. Biddle
Henry Ford

Inventors
D. J. Jones
W. L. Clouse
By W. H. Burridge
Atty.

UNITED STATES PATENT OFFICE.

DEXTER J. JONES AND WILLIAM L. CLOUSE, OF TIFFIN, OHIO.

SCREW-CUTTING MACHINE.

SPECIFICATION forming part of Letters Patent No. 521,543, dated June 19, 1894.

Application filed January 18, 1893. Serial No. 458,856. (No model.)

*To all whom it may concern:*

Be it known that we, DEXTER J. JONES and WILLIAM L. CLOUSE, citizens of the United States, residing at Tiffin, in the county of Seneca and State of Ohio, have invented a certain new and Improved Screw-Cutting Machine, of which the following is a full, clear, and complete description.

The nature of our invention relates to the automatic opening device, tool head and cases of a screw or bolt cutting machine.

The object of the invention is to facilitate the working of machine, the saving of time and skilled labor, and at the same time providing a machine that will cut a smooth perfect screw thread.

That the invention may be fully seen and understood by others skilled in the art, reference will be had to the following specification and annexed drawings forming part thereof, in which—

Figure 1:
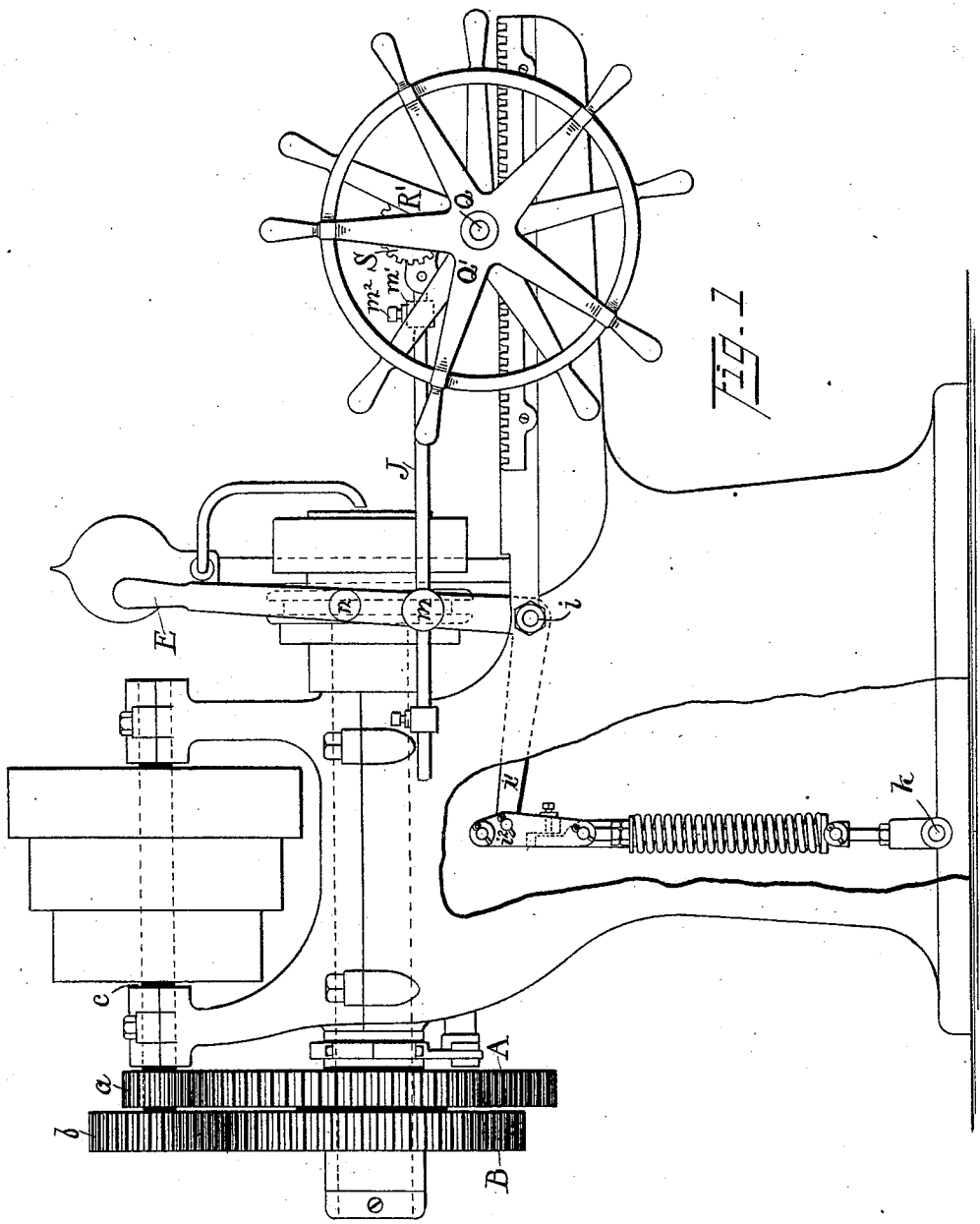
Figure 14:
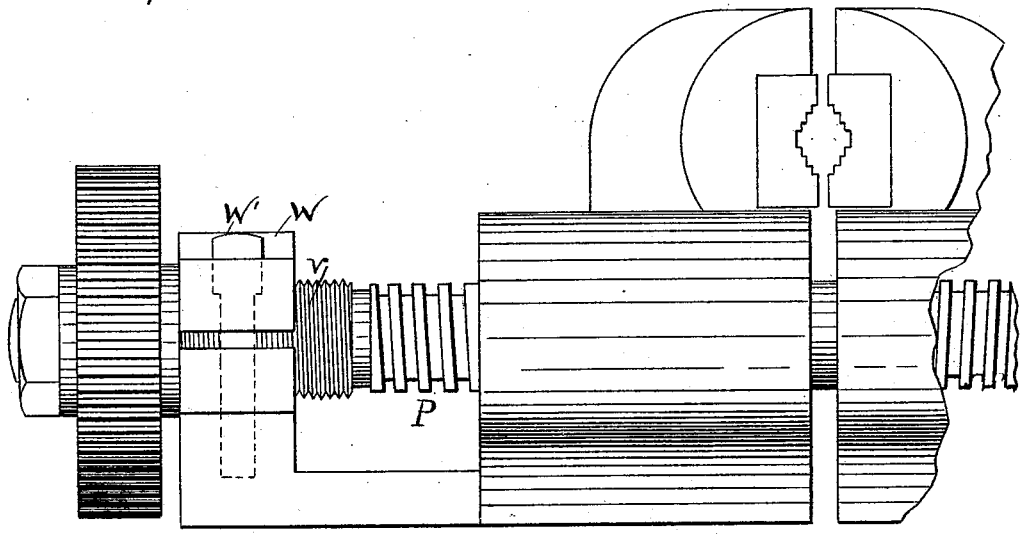
Figure 15:
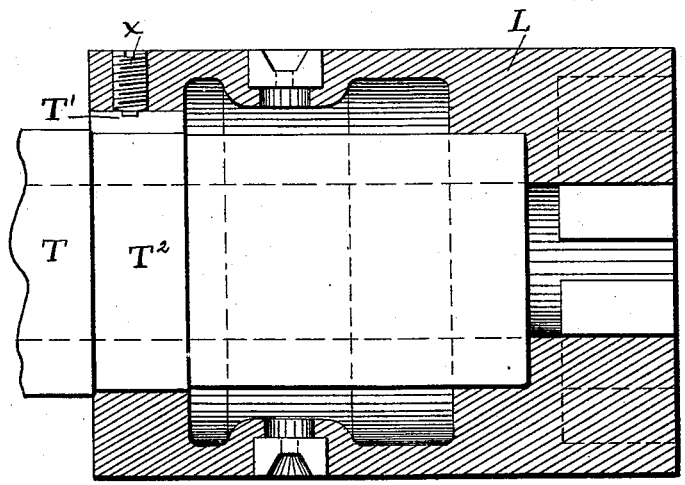

Figure 1 is a side elevation of our improved machine with a portion thereof broken away to show the automatic opening device. Fig. 2 is an end view. Fig. 3 is an enlarged front view of the opening device closed. Fig. 4 is a side view of said device open. Fig. 5 is a vertical section of a portion of said device. Fig. 6 is an enlarged side elevation of one of the cases and tool detached. Fig. 7 is a longitudinal vertical section of one of the cases with the tool removed. Fig. 8 is a plan view of one of the cases and tool. Fig. 9 is a plan view of same with a portion broken away to show the means for securing the tool in the case. Fig. 10 is an end view of the head with the tools closed. Fig. 11 is a similar view with the tools open. Fig. 12 is a longitudinal vertical section of the head open. Fig. 13 is a partial section of same closed. Fig. 14 is a detached view of the vise, vise-screw and adjustment and Fig. 15 is an enlarged sectional view of the head, showing the means for attaching same to the spindle.

Similar letters of reference designate like parts in the drawings and specification.

In the following description of our improved machine it is not deemed necessary to enter into a detailed description of a screw-cutting machine, as parts of the mechanism are of the ordinary kind familiar to those skilled in the art. The description will therefore be confined to our improvements and their connection with the entire machine.

The automatic opening device is described as follows: The bell-crank lever E, Figs. 1 and 2, is pivoted to the body of the machine at $i$, Fig. 1, the arm $i'$ extending in the interior of the body of the machine and pivoted at its extremity $i^2$ to the frame $j$, above the center, (said frame and attachments are best shown in Figs. 3, 4 and 5.) Pivoted to the lower extremity of the frame $j$ is the rod F, which extends downward and is pivoted to the base of the body as shown at $k$, Fig. 1. Pivoted to the upper terminal of the frame $j$ are the two straps G, G' (one of which is removed in Fig. 1 to show the spring mechanism); the opposite terminals of the straps are pivoted to a collar H, circumscribing the rod F. Encircling the rod F, between the sleeve H and an upper sleeve H' is a spiral spring I, the upper terminal bearing on the sleeve H' and the lower terminal on the sleeve H. The sleeve H' is adjusted on the rod F by means of the nuts $l$, $l'$. The rod J, Fig. 1, is pivoted to the vise carriage and passes loosely through the upward extending arm of the bell-crank lever as shown at $m$, Fig. 1. A stop $m'$ slides on the rod J and may be adjusted at any point by means of the set-screw $m^2$. When the stop $m'$ comes in contact with the bell-crank lever E, by the moving forward of the vise carriage, the arm $i'$ being pivoted, as above stated, over the center of the frame $i^2$, will cause the rod F and spring I to be thrown out of line, as shown in Fig. 4; this will cause the lever E to recede and open the head owing to a swivel attachment of said lever to the rear or shipper-collar of the head at $n$. The head is closed by carrying the lever forward, which will again bring the rod F into an upright position. The extending portion F' of the rod F coming in contact with the set-screw K, prevents the rod from being thrown forward too far past the center.

The head of the machine is constructed substantially as illustrated in Figs. 10, 11, 12, 13, and 15, in which L represents the barrel; L' the shipper-collar. The barrel L, on which the collar L' slides, is provided with recesses $o$, $o$, having inclined walls as shown in Figs. 12 and 13; in these recesses rests the locking device, consisting of pieces of metal M, cylindrical in form. The shipper-collar is provided with channels $p$, the walls of one end of which are inclined. When the cylinders M, M are in the recesses $o, o$, they bear against the two inclined sides of said recesses and the inclined wall $o'$, of the channels $p$ and thus hold them firmly in place. When the cylinders are out of the recesses in the position shown in Fig. 12, the surface $o^2$ bears against them and also the surface $o^3$, of the barrel L so that when the collar is actuated to assume its normal or closed position the cylinders revolve, whereby friction and consequent wear of the barrel will be largely obviated. The adjusting screws $q, q$ are encircled by the spiral springs $r, r$, within the channels $p$.

One of the most important features of our improved machine is the manner of adjusting and of cutting the tools in their cases. In the detached views Figs. 6, 7, 8, and 9, one case and tool are shown full size. A recess $s$, Figs. 8 and 10, is cut in the body of the case N to receive the tool. The hole $s'$, in the tool, is tapered as shown in Fig. 9. The head of the screw $t$ is also tapered as shown, thus when the tool O is placed in the recess $s$ and the screw $t$ tightened, the tool O will be forced against the side of said recess nearest the threaded portion of the hole in the case N. The tools being provided, as hereinbefore stated, with a tapered hole and the screw-head also tapered, said head wedging itself into the hole will necessarily bring the tool to the identical position relative to the case in all instances, when the tool is placed in the case and the screw tightened. In cutting the tools, we do not use the same case that we do for working them; the difference being in the recess $s$. In the cases in which the tools are cut, the recess $s'$ is advanced from one thirty-second to one one-hundredth of an inch from the center, according to the size of the tool. This admits of the tool being cut ahead of the center the right distance, so that when it is put into the working case it will drop back to working distance, giving the right amount of clearance to the tool. This causes a great saving of time and expense, as it is not necessary to employ an extremely skilled mechanic to sharpen the tools, as has heretofore been required.

For adjusting our vise-screw P, Figs. 2 and 14, we rotate the screw shaft in a threaded bushing $v$, which is threaded in the box W. It will readily be seen that, by loosening the screw W', the screw may be easily adjusted and by tightening said screw W' the bushing is held firmly clamped. The rack-shaft Q is immediately under the vise-screw P and is rotated by means of the hand-wheel Q', Figs. 1 and 2. The pinion R is fast on the hub of the hand wheel R', said pinion and wheel running loosely on the shaft Q. The pinion R meshes with the pinion S, said pinion being fast to the end of the vise-screw. By the arrangement just described only one shaft is necessary, for by turning the hand-wheel Q the carriage is reciprocated above the rack by means of suitable pinions fast on the rack-shaft and engaging said rack and by turning the hand-wheel R' the vise-screw is rotated as before described.

In Fig. 15 is shown the spindle T, having two offsets which are received into suitable annular bearings in the barrel L. The key T' is let into the shoulder $T^2$, of the spindle T and projects above the same to register with a suitable key-way in the barrel L. The set-screw $x$, in the barrel L, when turned down onto the key T', secures the barrel to the spindle. The spindle may be constructed without the offsets or shoulders without departing from the nature of the invention.

What we claim as our invention, and desire to secure by Letters Patent, is—

1. In a screw-cutting machine an opening mechanism having a lever E pivoted to the body of the machine and connected with the head by means of a swivel block at $n$, engaging in a grooved ring operating conjointly with the rod J and stop $m'$, in combination with the straps G, G', rod F, spiral spring I and frame $j$ to which said lever E is pivoted, the lower terminal of the rod F pivoted to the bed plate of the machine, substantially as and for the purpose set forth.

2. In a screw cutting machine, the cylinders M, M arranged in cavities in the shipper-collar, said cavities in open connection with the recesses in the barrel, the spiral-springs $r$, $r$ and adjusting screws $q$, $q$, in combination with said barrel having two annular bearings and a key-way, the set-screw $x$, the shouldered spindle T and the key T', in the manner substantially as and for the purpose set forth.

3. In a screw-cutting machine, the head constructed with a stop-motion device consisting of the cylinders M, M, arranged in cavities in the shipper-collar said cavities being in open connection with the recesses in the barrel, operating conjointly with the spiral springs $r$, $r$ and adjusting screws $q$, $q$, substantially as and for the purpose set forth.

4. In a screw-cutting machine, the automatic opening device consisting of the straps G, G', rod F, spiral spring I and frame $j$, in combination with any suitable means for operating the same for the purpose set forth.

In testimony whereof we affix our signatures in presence of two witnesses.

DEXTER J. JONES.
WILLIAM L. CLOUSE.

Witnesses:
JNO. K. ROHN,
WILLIS BACON.